United States Patent [19]

Field, Jr.

[11] 4,208,874

[45] Jun. 24, 1980

[54] APPARATUS FOR PRODUCING DIFFERENT FLOW RATES OF A FLUID

[75] Inventor: Jesse L. Field, Jr., Braidwood, Ill.

[73] Assignee: Caterpillar Tractor Co., Peoria, Ill.

[21] Appl. No.: 937,233

[22] Filed: Aug. 28, 1978

[51] Int. Cl.[2] ........................ F15B 11/16; F16H 39/46

[52] U.S. Cl. ........................................ 60/420; 60/445; 60/484; 60/494

[58] Field of Search ................. 60/420, 428, 429, 445, 60/450, 452, 484, 494

[56] References Cited

U.S. PATENT DOCUMENTS

| | | | |
|---|---|---|---|
| 3,713,295 | 1/1973 | Haak et al. | 60/452 |
| 3,720,059 | 3/1973 | Schurawski et al. | 60/421 |
| 3,768,928 | 10/1973 | Miller et al. | 60/450 X |
| 3,871,178 | 3/1975 | Tominaga | 60/484 X |
| 3,990,237 | 11/1976 | Van Gerpen | 60/484 X |

OTHER PUBLICATIONS

Product Education Bulletin No. 26, by Cessna Fluid Power Division, Hutchinson, Kan.

*Primary Examiner*—Edgar W. Geoghegan
*Attorney, Agent, or Firm*—Phillips, Moore, Weissenberger, Lempio & Majestic

[57] ABSTRACT

A fluid system (10, 10A, 10B) which supplies two work systems (26, 38) with respective different fluid flow rates, including a pressure-flow compensated pump (12), a first control valve (18) for delivering the fluid to one of the work systems, a second control valve (28) for receiving the fluid from the first control valve and delivering the fluid to the other of the work systems (38), a first device ([20,42,50] or [20,56,58] or [20,90,96]) coupled between the pump output and the first control valve, for providing one control signal causing the pump to produce one flow rate of fluid for activating the one work system (26), and a second device ([20,40,44,46,50] or [22,58,66,72,78] or [22,88,92,96,102]) for overriding the first device for providing another control signal causing the pump to produce another flow rate of fluid for actuating the other work system.

17 Claims, 3 Drawing Figures

APPARATUS FOR PRODUCING DIFFERENT FLOW RATES OF A FLUID

TECHNICAL FIELD

This invention relates to fluid control systems and, more particularly, to apparatus for producing different flow rates of a fluid through the system.

BACKGROUND ART

Earthworking vehicles, such as track-type tractors, typically will have various implements for performing different functions. For example, the vehicle will have a dozer blade supported on a forward end of the vehicle main frame and a backhoe supported on a rearward end of the main frame. Usually, hydraulic fluid systems are employed to operate these implements under the control of the vehicle operator.

The above implements normally have different fluid flow requirements for their operation. For example, a relatively small rate of fluid flow is needed for operating the dozer blade or some other implement at the forward end of the frame, whereas a relatively large rate of fluid flow is required to run the backhoe. Because of these dual flow requirements, a problem in prior hydraulic fluid systems is that they have employed relatively complex fluid systems, including complex controls for the systems, so that different flow rates of fluid could be provided to operate the implements as needed.

DISCLOSURE OF THE INVENTION

The present invention is directed to overcoming one or more of the problems as set forth above.

In one aspect of the present invention, apparatus is provided for producing different flow rates of a fluid, comprising a pump having means for changing the flow rate of the fluid at the output of the pump, first means for providing a first control signal to the changing means, and second means, selectively movable for overriding the first providing means, for providing a second control signal to the changing means. The flow rate changing means is responsive to the first control signal and the second control signal to produce respective flow rates at the pump output.

BEST MODE FOR CARRYING OUT THE INVENTION

Figure 1:
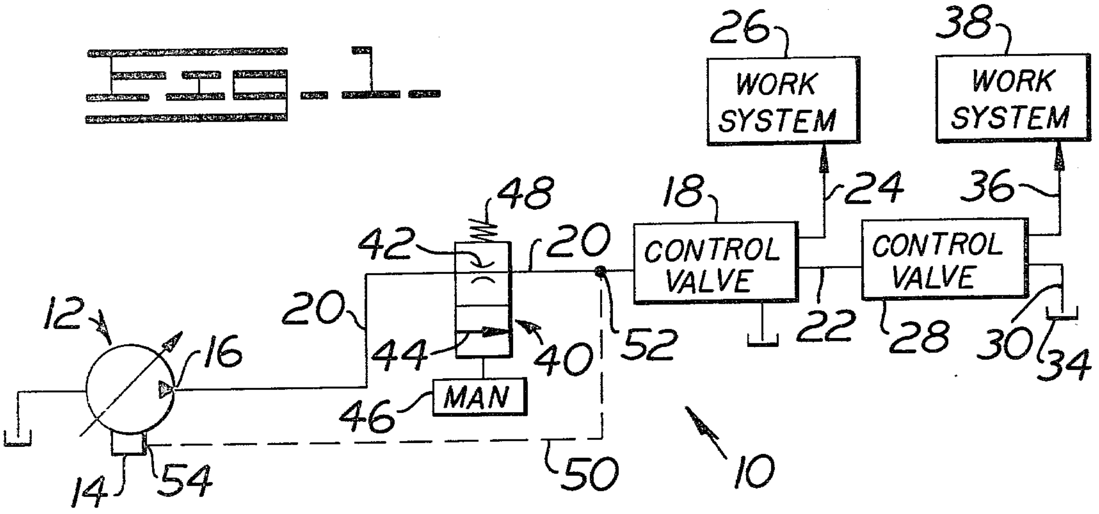
FIG. 1 is a schematic illustration of one embodiment of the present invention.

FIG. 1 shows, as one embodiment, a fluid control system 10 for producing different flow rates of a hydraulic fluid as needed. A variable displacement pump 12 has a flow compensator assembly 14 which controls the displacement of the pump 12 to provide different flow rates of fluid at a pump output 16. The flow compensator assembly 14 responds to pressure signals for changing the pump displacement and hence the flow rate at the output 16. One type of suitable pump 12 is known as a pressure-flow compensated piston pump manufactured by the Cessna Corporation, Hutchinson, Kansas, under model No. 70523, which operates as a function of differential pressure in the compensation assembly 14.

A control valve 18 receives the hydraulic fluid from a fluid conductor 20 which is coupled at one end to the pump output 16. The control valve 18 can be one of several types well-known in the art. For purposes of the present discussion, the control valve 18 is assumed to be an interrupted series type valve. Other types of valves will be mentioned below. The control valve 18 can direct the hydraulic fluid from the conductor 20 to a fluid connector 22 and a fluid conductor 24. In a centered position, the valve 18 will direct all the fluid from the conductor 20 to the conductor 22. In a fully shifted position, the valve 18 will direct all the fluid in the conductor 20 to the conductor 24. In positions between the centered and fully shifted positions, the valve 18 will direct a portion of the fluid in the conductor 20 to the conductor 24, with the remaining portions being directed to the conductor 22.

A work system shown generally at 26 is actuated by the fluid flowing in the conductor 24.

A control valve 28, which can be one of several types well-known in the art, similar to valve 18, receives the hydraulic fluid from the conductor 22. If the valve 28 is assumed to be an interrupted series type, then in a centered position, the valve 28 will direct all the fluid in the conductor 22 to a fluid conductor 30 leading to a drain 34. In a fully shifted position, the valve 28 will direct all the fluid in conductor 22 to a conductor 36. In positions between the centered and fully shifted positions, the valve 28 will direct a portion of the fluid in the conductor 22 to the conductor 36, with the remaining fluid being directed to the conductor 34. A work system shown generally at 38 is actuated by the fluid flowing in the conductor 36.

To control the compensator assembly 14 and, hence, vary the fluid flow rate at the pump output 16 by changing the pump displacement, the fluid within the conductor 20 is transferred to the control valve 18 through a two-position control valve 40. In one position of the control valve 40, a flow restrictor 42 is placed within the conductor 20 so that there is a pressure drop across this restrictor from the upstream or input end to the downstream or output end. In the other position of the control valve 40, a flow passage 44 of less restriction than the flow restrictor 42 is placed within the conductor 20. In the example given, the passage 44 provides no restriction so that there is no pressure drop through this passage. A mechanism shown generally at 46 is manually operable to move selectively the valve 40 to either position for placing either the flow restrictor 42 or the flow pressure 44 in the conductor 20. As ilustrated, the control valve 40 is biased by a spring 48 to a normal position in which the flow restrictor 42 is within the conductor 20.

A signal line 50 is coupled at one end 52 to the conductor 20 between the control valve 40 and the control valve 18, and at the other end 54 to the flow compensator assembly 14. The signal line 50 responds to the fluid flowing through the conductor 20 to the control valve 18 by generating or providing pressure control signals to the flow compensator assembly 14 having a value depending on the pressure of the fluid flowing past the end 52.

When the control valve 40 is in the position shown in FIG. 1, and the pump 12 is in operation, the hydraulic flow from the pump output 16 will flow through the conductor 20 and the flow restrictor 42 and past the signal line 50 to the control valve 18. Due to the pressure drop provided by the flow restrictor 42, the fluid flowing past the end 52 will produce a signal in the line 50 which will create a pressure differential within the flow compensator assembly 14 to provide a pump displacement to maintain one rate of fluid flow. If the pump 12 is to provide a different flow rate at the output 16, then the control valve 40 will be manually shifted to decouple the flow restrictor 42 from the conductor 20 and replace or override it with the relatively unrestricted flow passage 44. Consequently, there will be less or no pressure drop across the passage 44 than across the restrictor 42 so that the fluid flowing to the control valve 18 past the end 52 will be at a higher pressure thane when the flow restrictor 42 is within the conductor 20. Therefore, this higher pressure fluid flow will result in another pressure signal in the line 50 thus eliminating the differential pressure in the flow compensator assembly 14 to change the displacement of the pump 12 to produce a different flow rate at the pump output 16. Thus, depending on the position of control valve 40, different flow rates of fluid will be provided by the pump 12.

As one example of a particular use for the fluid control system 10, the work system 26 constitutes a hydraulically operated dozer blade on a track-type tractor earthworking vehicle, while the work system 38 constitutes a hydraulically operated backhoe on the same vehicle. The control valves 18 and 28 can be controlled manually by the vehicle operator or actuated automatically in any well-known manner to control the direction of the hydraulic fluid through these valves. The work system 26 requires a lesser flow rate of the hydraulic fluid for its operation, whereas the work system 38 requires a greater flow rate of the hydraulic fluid for its operation.

If, for example, the work system 26 is to be actuated, the control valve 40 will be in the position shown in FIG. 1 and the control valve 18 moved to a position to direct all of the fluid within the conductor 20 to the conductor 24. With the pump 12 in operation, the flow compensator assembly 14 will respond to the one pressure control signal in the signal line 50 to provide the lesser flow rate at the pump output 16 in the manner already described.

Should it be desired to operate the work system 38, without operating the work system 26, the control valve 40 will be shifted to override the flow restrictor 42 and place the flow passage 44 in the conductor 20. Also, the control valve 18 will be shifted to its centered position to communicate all the fluid in the conductor 20 with the conductor 22. The control valve 28 also will be shifted to communicate the conductor 22 with the conductor 36 so that the work system 38 will be actuated by the hydraulic fluid pumped by the pump 12. In this shifted position of the control valve 40, as already described the compensator assembly 14 will respond to the new control signal in line 50 to vary the displacement of the pump 12 so that a greater flow rate will be provided at the pump output 16.

Figure 2:
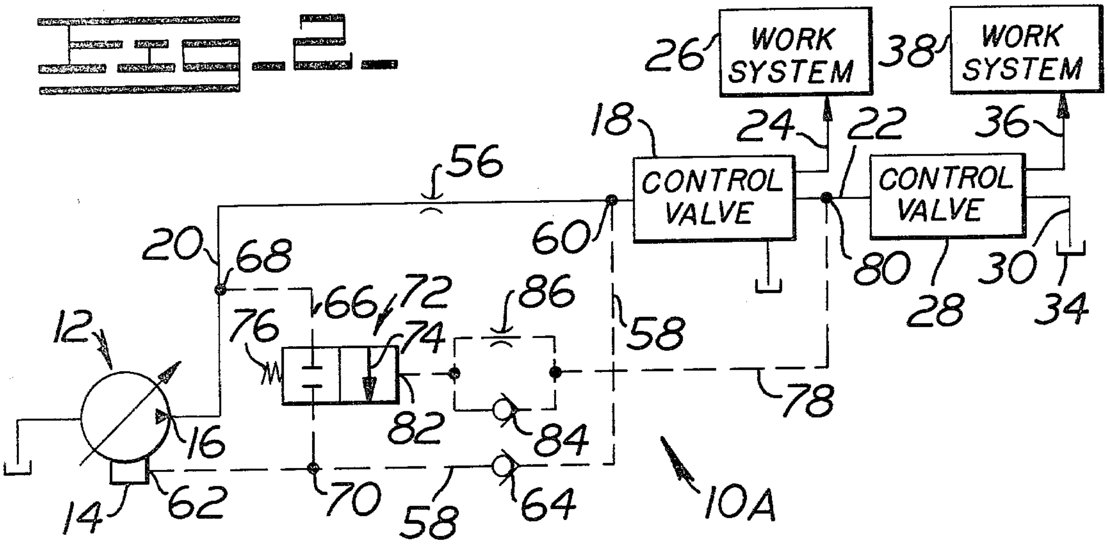
FIG. 2 is a schematic illustration of a second embodiment of the present invention.

FIG. 2 illustrates a fluid control system 10A for providing different flow rates of hydraulic fluid, which is an alternative embodiment to the fluid control system 10 shown in FIG. 1. In FIG. 2, like reference numerals are used to indicate like elements shown in FIG. 1. As illustrated, the system 10A includes the variable displacement pump 12 which pumps the hydraulic fluid through the conductor 20 to the control valve 18 and the control valve 28 for actuating the work system 26 or 38 in the manner described in connection with FIG. 1.

A flow restrictor 56 is permanently fixed within the conductor 20 to provide a pressure drop thereacross relative to the fluid flow rate from the pump output 16. A signal line 58 is coupled at one end 60 to the conductor 20 and at the other end 62 to the flow compensator assembly 14. A check valve 64 is positioned within the signal line 58 for reasons which will be described below.

Another openable and closeable signal line 66 is coupled at one end 68 to the conductor 20 between the pump output 16 and the flow restrictor 56 and at another end 70 to the signal line 58 between the flow compensator assembly 14 and the check valve 64. A two-position control valve 72 is selectively moveable to one position shown in FIG. 2 in which the signal line 66 is closed, i.e., the end 68 is not in communication with the end 70, and is selectively movable to another position to open the line 66 through a signal passage 74 in which the end 68 is in communication with the end 70. A spring 76 biases the control valve 72 to the one or normal position shown in FIG. 2.

The control valve 72 is responsive to a pressurized signal in a signal line 78 to be moved from the normal position shown in FIG. 2 to the other position in which the signal line 66 is opened. The signal line 78 is coupled at one end 80 to the conductor 22 between the control valve 18 and the control valve 28, and at the other end 82 to the control valve 72. The signal line 78 has a parallel path in which one branch has a check valve 84 and another branch has a restrictor 86.

If it is assumed the valve 28 has been shifted to actuate the work system 38, as the hydraulic fluid flows through the conductor 22 past the end 80, a pressure signal will be provided in and carried along the signal line 78 via a one way path through the check valve 84 and via a restricted two-way path through the restrictor 86 to the valve 72. This signal will be high enough due to the load of the system 38 to cause the valve 72 to change positions to open the signal line 66 with the signal passage 74. This communication between ends 68 and 70 of line 66 interrupts the originally established differential pressure acting on flow compensator assembly 14. In the event there is a short temporary drop in the fluid pressure through the conductor 22, for whatever reason, the check valve 84 will close, forcing the pressure signal at the end 82 of the line 78 to bleed slowly back through the restrictor 86. This will prevent the control valve 72 from quickly returning to the position shown in FIG. 2. This in turn will provide time for the fluid pressure in the conductor 22 to return to normal so that the control valve 72 may be maintained in its position for opening the signal line 66. If the valve 28 is centered, i.e., directing all the fluid in the conductor 22 to the drain 34, there will not be any such system load so that any pressure signal in the line 78 will not be high enough or of sufficient magnitude to cause the valve 72 to change positions to open the signal line 66. Hence, the valve 72 is only shifted when the work system 38 is being actuated.

In the operation of the system 10A, assume that the pump 12 is pumping the hydraulic fluid from its output 16 and the control valve 18 is in a position communicating at least some fluid in the conductor 20 with the conductor 24. Also assume that the work system 38 is not being actuated so that any fluid flow in the conductor 22 at this time is being dumped to the drain 34 by the valve 28. As the fluid flows through the restrictor 56 and past the end 60, a pressure control signal is generated or provided in the line 58 and carried through the check valve 64 to the flow compensator assembly 14. Consequently, the pump 12 will be displaced to provide one flow rate of fluid. Since at this time the work system 38 is not being operated, no pressurized control signal of sufficient magnitude will be provided in the line 78 to move the control valve 72 to the position for opening the signal line 66. Thus, at this time the flow compensator 14 will be responsive to the pressure control signal in the line 58 and not to any pressure control signal in the line 66 thereby providing the lesser flow rate of fluid at the output 16.

If the greater flow rate of fluid is required at the pump output 16, the pressurized control signal of sufficient magnitude is provided in the signal line 78 by transferring the hydraulic fluid from the conductor 20 to the conductor 22 and shifting the valve 28 off center. This pressurized signal in the line 78 will thereby move the control valve 72 to its position in which the signal line 66 is opened with the signal passage 74.

With the signal line 66 opened, as the fluid from the pump output 16 flows past the end 68, a pressure control signal will be generated or provided in the line 66 that is coupled back to the flow compensator assembly 14 through the connection of the end 70 with the line 58. The fluid flowing in the conductor 20, as it passes the end 68, does not experience a pressure drop as it would when passing through the flow restrictor 56 towards the end 60 of the signal line 58. Consequently, the pressure signal in the signal line 66 is at a different value than the signal generated in the line 58 by the flow past the end 60. In fact, the pressure control signal in the line 66 is at a higher value than the signal generated at the end 60 so that the check valve 64 will be closed. Consequently, the control signal in the line 66 overrides the pressure signal generated at the end 60 so that the flow compensator assembly 14 will respond only to the absence of a differential pressure. Therefore, the displacement of the pump 12 will be changed so that a greater flow rate is provided at the pump output 16. The check valve 64 also prevents the higher pressure signal in the line 66 from backing up through the line 58 to the downstream side of the flow restrictor 56.

While the above operation of the fluid control system 10A has been given, specific examples of its use will now be described for yet a better understanding of the invention. If only the work system 26 requiring a relatively smaller flow rate is to be activated, the control valve 18 can be moved to communicate all the fluid in the conductor 20 with the conductor 24. The pressure control signal will then be provided in the signal line 58 through the check valve 64 to control the flow compensator assembly 14 and, thereby, cause a relatively small flow rate at the pump output 16. If only the work system 38 requiring a relatively large flow rate is to be activated, the control valve 18 is shifted to communicate all the fluid in the conductor 20 with the conductor 22, while the control valve 28 is shifted to communicate the conductor 22 with the conductor 36. As a result, the displacement of the pump 12 will be automatically changed to provide a greater flow rate at the pump output 16. This is accomplished, as already noted, by coupling the greater pressure signal in the signal line 66 to the flow compensator assembly 14 after shifting the control valve 72 with the control signal generated in the line 78. If both work systems 26 and 38 are to be activated simultaneously, the greater flow rate will be provided by the pump 12 due to the control signal generated in the line 78.

It may be appreciated that while different pressure control signals are provided in the control lines 58 and 66, substantially the same control signal may be provided in the control lines 58 and 78. However, whereas the signal in the line 58 controls the compensator 14, the signal in the line 78 controls the control valve 72.

Figure 3:
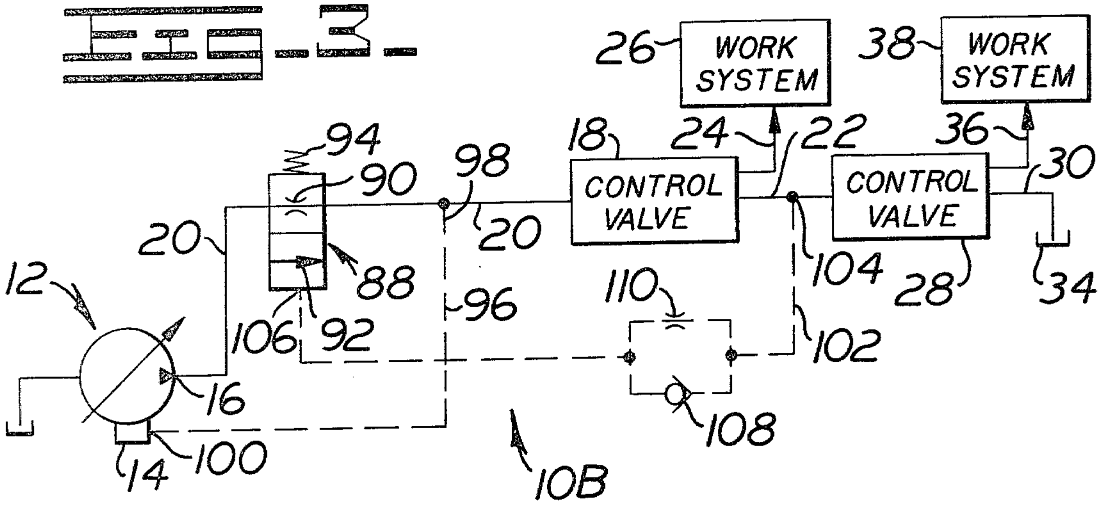
FIG. 3 is a schematic illustration of a third embodiment of the present invention.

FIG. 3 illustrates a fluid flow control system 10B which is an alternative embodiment to the respective embodiments shown in FIGS. 1 and 2. In FIG. 3, like reference numerals are used to indicate like elements shown in FIGS. 1 and 2. Again, the pump 12 may be used to deliver different flow rates of hydraulic fluid through the conductor 20 to actuate the work systems 26 and 38 through the control valves 18 and 28 in a similar manner to that already described.

A selectively movable, two-position control valve 88 has one position in which a flow restrictor 90 is placed in the conductor 20 and another position in which a flow passage 92 of less or no restriction than the restrictor 90 is placed in the conductor 20. A spring 94 biases the valve 88 into the normal position shown in which the flow restrictor 90 is in the conductor 20.

A control signal line 96 is coupled at one end 98 to the conductor 20 between the control valve 88 and the control valve 18, and at the other end 100 to the flow compensator assembly 14. As will be described, different pressure control signals are generated or provided in the signal line 96 to control the compensator assembly 14 for providing different flow rates of the fluid from the pump output 16. Another control signal line 102 is coupled at one end 104 to the conductor 22 between the control valve 18 and the control valve 28 and at the other end 106 to the control valve 88 to move the latter to its position in which the flow passage 92 overrides or replaces the flow restrictor 90. The signal line 102 includes a parallel signal path having a check valve 108 and a restrictor 110 which have the same function as the check valve 84 and the restrictor 86 of FIG. 2.

In the position of the control valve 88 shown in FIG. 3, with the pump 12 in operation, there will be a pressure down as the fluid flows through the restrictor 90. The fluid flowing past the end 98, which fluid has dropped in pressure, will thereby result in a pressure control signal of one value in the line 96 to cause the flow compensator to cause a change in the displacement of the pump and provide one flow rate from the pump output 16.

When the hydraulic fluid is flowing through the conductor 22 and the valve 28 is shifted to activate the system 38, a control signal of sufficient magnitude will be provided in the signal line 102 to cause the control valve 88 to shift automatically to its position in which the flow passage 92 is within the conductor 20. Consequently, at this time, there will be no or a lesser pressure drop in the fluid flowing through the conductor 20 so that a different control signal is provided in the line 96 than when the flow restrictor 90 is effective. The flow compensator assembly 14 will thereby respond to this different pressure control signal in the line 96 by changing the pump displacement to provide a different flow rate at the pump output 16. Without the shifting of the valve 28 off center to actuate the system 38, any control signal in the line 102 will not be of sufficient magnitude to cause the valve 88 to shift from the position shown.

The fluid control system 10B can be used in a similar manner as 10A to activate the work system 26 or the work system 38 or both simultaneously. If only the work system 26 requiring a lesser flow rate is to be activated, the control valve 18 can be shifted to communicate all the fluid in the conductor 20 with the conductor 24 and prevent communication between the conductor 20 and the conductor 22. Accordingly, the control valve 88 will be in its normal position shown with the flow restrictor 90 in the conductor 20 and a pressure control signal of one value being generated in the line 96. Therefore, the displacement of the pump 12 will result in a relatively small flow rate of the fluid at the pump output 16 for transfer to the conductor 20 and the control valve 18 to the conductor 24. If only the work system 38 requiring a greater flow rate is to be activated, the control valve 18 is shifted to communicate the conductor 20 with the conductor 22 and the control valve 28 shifted to communicate the conductor 22 with the conductor 36. With fluid flow through the conductor 22, the valve 88 will be moved to place the flow passage 92 in the conductor 20 and, thereby, a pressure control signal of another value will be provided in the signal line 96. Consequently, the displacement of the pump 12 will be changed to provide a greater flow rate at the pump output 96 to meet the requirements of the work system 38. If both systems 26 and 38 are to be actuated simultaneously, the greater flow rate will be provided by the pump 12 due to the control signal generated in the line 102.

Industrial Applicability

The control valves 18 and 28 have been shown to be in an interrupted series relationship. However, it will be appreciated by those skilled in the art that these valves 18 and 28 can be in a parallel flow relationship in which the same flow from pump 12 is conducted simultaneously to the inputs of the valves. In this parallel relationship, the valve 40 in FIG. 1 can be manually shifted as already discussed to provide the different flow rates for actuating the systems 26 and 38, and the valves 72 and 88 in FIGS. 2 and 3, respectively cam be automatically shifted in the manner described for actuating the work systems 26 and 38. It also will be appreciated that the present invention is applicable to systems in which the valves 18 and 28 are in a series relationship in which all the flow from the valve 18 is directed to the work system 26 and then from the work system 26 to the input of the valve 28. Again, in this series relationship, the valve 40 can be manually shifted and the valves 72 and 88 automatically shifted to actuate the work systems 26 and 38 as described above.

As one example, the work system 26 constitutes a hydraulically operated dozer blade on a track-type tractor earthworking vehicle, while the work system 38 constitutes a hydraulically operated backhoe on the same vehicle. The control valve 18, while shown generally, would comprise a valve package of three, normally centered valves which are in a parallel flow relationship with one another so that the fluid flow in the conductor 20 is received simultaneously by each of these three valves. Each of the three valves may be shifted off center to independently control one operation of the dozer blade. For example, one valve of the package can be shifted to direct fluid from the conductor 20 to the work system 26 to control the raising and lowering of the dozer blade, the second valve of the package can be shifted to direct fluid from the conductor 20 to the system 26 to tilt the blade forward and backward, and the third valve can be shifted to direct fluid from the conductor 20 to the system 26 to angle the blade.

The control valve 28, while also shown generally also can comprise a valve package of three, normally centered valves which are in a parallel flow relationship so that fluid in the conductor 22 is received simultaneously by each of these three valves. Each of the three valves of this package can be shifted off center to independently control one operation of the backhoe. For example, the first valve of the package can be shifted to direct fluid from the conductor 22 to the work system 38 to raise and lower a boom connected to the backhoe, the second valve can be shifted to direct fluid from the conductor 22 to the system 38 to swing the backhoe, and the third valve can be shifted to direct fluid from the conductor 22 to the system 38 to cause the backhoe to dig.

Other aspects, objects and advantages of this invention can be obtained from a study of the drawings, the disclosure and the appended claims.

What is claimed is:

1. Apparatus (10, 10B) for producing different flow rates of fluid, comprising:

(a) a pump (12) having an output (16) and means (14) for changing the flow rate of the fluid at said pump output (16) in response to a first or a second control signal;

(b) first means ([20,42,50] or [20,90,96]), coupled to said pump output (16), for generating said first control signal, including a flow restrictor (42 or 90) for receiving fluid flow from said pump output (16) and for producing a pressure drop thereacross; and (c) second means ([20,40,44,46,50] or [22,88,92,96,102]), selectively movable for overriding said first generating means ([20,42,50] or [20,90,96]), for generating said second control signal, including means ([40,44,46] or [88,92,102]) for decoupling said first signal generating means ([20,42,50] or [20,90,96]) from said pump output (16), said decoupling means ([40,44,46] or [86,92,102]) including (i) a flow passage (44 or 92) being unrestricted in relation to said flow restrictor (42 or 90); and (ii) means ([40,46] or [88, 102]) for replacing said flow restrictor (42 or 90) with said flow passage (44 or 92).

2. Apparatus (10) according to claim 1 wherein said means (40, 46) for replacing comprises:

(a) control valve means (40), having said flow passage (44), for movement between two positions, said flow restrictor (42) also being in said control valve means (40); and (b) manual means (46) for moving said control valve means (40) between one position in which said flow restrictor (42) is coupled to said pump output (16) and another position in which said flow passage (44) is coupled to said pump output (16).

3. Apparatus (10B) according to claim 1 wherein said means (88, 102) for replacing comprises:

(a) control valve means (88), having said flow passage (92), for movement between two positions, said flow restrictor (90) also being in said control valve means (88); and (b) means (102) for automatically moving said control valve means (88) between one position in which said flow restrictor (90) is coupled to said pump output (16) and another position in which said flow passage (92) is coupled to said pump output (16).

4. Apparatus (10A) for producing different flow rates of fluid, comprising:

(a) a pump (12) having an output (16) and means (14) for changing the flow rate of the fluid at said pump output (16) in response to a first or a second control signal;

(b) first means (20,56,58) for generating said first control signal, including (i) a flow restrictor (56), having an inlet connected to said pump output (16) and an outlet, for producing a pressure drop in the fluid flowing thereacross, and (ii) first means (58), having one end (60) connected to said outlet and another end (62) connected to said flow rate changing means (14), for sensing the pressure of the fluid at said outlet; and (c) second means (22,58,66,72,74,78), selectively movable for overriding said first generating means (20,56,58), for generating said second control signal, including (i) openable and closeable second means (66), connected between said pump output (16) and said flow rate changing means (14), for sensing the pressure of the fluid at said pump output (16);

(ii) movable control valve means (72,74) for opening and closing said openable and closeable means (66), and (iii) means (78) for generating a third control signal to move said control valve means (72,74) between one position in which said openable and closeable means (66) is open and another position in which said openable and closeable means (66) is closed.

5. Apparatus (10A) according to claim 4 wherein said openable and closeable means (66) includes a signal carrying line (66) having one end (68) connected between said pump output (16) and said inlet and another end (70) connected between said one end (60) and said another end (62) of said first sensing means (58).

6. A fluid system (10, 10A, 10B) for supplying two work systems (26, 38) with respective different fluid flow rates, comprising:

(a) a pump (12) having an output (16) and means (14) for changing the flow rate of working fluid at said pump output (16);

(b) first control valve means (18) for delivering the working fluid to actuate one of the work systems (26);

(c) second control valve means (28) for delivering the working fluid to actuate the other of the work systems (38);

(d) first means ([20,42,50] or [20,56,58] or [20,90,96]), coupled between said pump output (16) and said first control valve means (18), for generating a first control signal; and (e) second means ([20,40,44,46,50] or [22,58,66,72,78] or [22,88,92,96,102]) for overriding said first control signal generating means and for generating a second control signal, said flow rate changing means (14) being responsive to the first control signal to produce working fluid of a first rate for delivering by said first control valve means (18) and being responsive to the second control signal to produce working fluid of a second rate for delivering by said second control valve means (28).

7. A fluid system (10, 10A, 10B) according to claim 6 wherein said first means ([20,42,50] or [20,56,58] or [20,90,96] for generating comprises:

(a) flow restrictor means (42 or 56 or 90) for transferring working fluid from said pump output (16) to said first control valve means (18) and for producing a pressure drop thereacross; and (b) first signal line means (50 or 58 or 96), coupled at one end (52 or 60 or 98) between said flow restrictor means (42 or 56 or 90) and said first control valve means (18) and at another end (54 or 62 or 100) to said flow rate changing means (14), for conducting the first control signal from said one end (52 or 60 or 98) to said another end (54 or 62 or 100).

8. A fluid system (10, 10B) according to claim 7 wherein said second means ([20,40,44,46,50] or [22,88,92,96,102]) for generating comprises:

(a) fluid passage means (44 or 92) of less restriction than said flow restrictor means (42 or 90) for transferring the working fluid from said pump output (16) to said first valve control means (18); and (b) means ([40,46] or [88,102]) for replacing said flow restrictor means (42 or 90) with said fluid passage means (44 or 92).

9. A fluid system (10, 10B) according to claim 8 wherein said replacing means ([40,46] or [88, 102]) comprises:

(a) third control valve means (40 or 88) for movement between a first position in which said flow restrictor means (42 or 90) transfers the working fluid and a second position in which said fluid passage means (44 or 92) transfers the working fluid; and (b) means (46 or 102) for moving said third control valve means (40 or 88) between said first position and said second position.

10. A fluid system (10) according to claim 9 wherein said means (46) for moving is manual.

11. A fluid system (10B) according to claim 9 wherein said means (102) for moving comprises third means (102) for generating a third control signal in response to working fluid flow between said first control valve means (18) and said second control valve means (28), said third control valve means (88) being responsive to the third control signal.

12. A fluid system (10B) according to claim 11 wherein said third means (102) for generating comprises second signal line means (102), connected at one end (104) between said first control valve means (18) and said second control valve means (28) and at another end (106) to said third control valve means (88), for carrying the third control signal.

13. A fluid system (10A) according to claim 6 wherein said second means (22,58,66,72,78) for generating comprises:

(a) openable and closeable first signal line means (66), coupled between said pump output (16) and said flow rate changing means (14), for carrying the second control signal;

(b) third control valve means (72) for opening and closing said first signal line means (66); and (c) second signal line means (78), coupled at one end (80) between said first control valve means (18) and said second control valve means (28) and at another end (82) to said third control valve means (72), for carrying a third control signal generated in response to working fluid flow between said first control valve means (18) and said second control valve means (28), said third control valve means (72) being responsive to the third control signal to open said first signal line means (66).

14. A fluid control system (10A, 10B), comprising:

(a) a pump (12) having an output (16) and means (14) for changing the flow rate of fluid at said pump output (16);

(b) first control valve means (18) for permitting therethrough the flow of the fluid from said pump output (16);

(c) second control valve means (28) for permitting therethrough the flow of the fluid from said first control valve means (18);

(d) first means ([20,56,58] or [20,90,96]) for generating a first control signal, including a first signal line (58 or 96) coupled at one end (60 or 98) between said pump output (16) and said first control valve means (18) and at another end (62 or 100) to said flow rate changing means (14) said signal line (58 or 96) carrying the first control signal; and (e) second means ([20,66,72,78] or [20,88,102]) for automatically generating a second control signal for carrying by said first signal line (58 or 96), said flow rate changing means (14) being responsive to the first control signal to provide one flow rate of fluid at said pump output (16) for use by said first control valve means (18) and to the second control signal to provide another flow rate of fluid at said pump output (16) for use by said second control valve means (28).

15. A fluid control system (10A, 10B) according to claim 14 wherein said second control signal generating means ([20,66,72,78] or [20,88,102)]) comprises means (78 or 102) for generating the second control signal when the fluid flows from said first control valve means (18) to said second control valve means (28).

16. A fluid control system (10B) according to claim 14 wherein said second control signal generating means ([20,66,72,78] or [20,88,102]) comprises:

(a) means (88) for relatively restricting the fluid flow between said pump output (16) and said first control valve means (18) depending on which one or the other flow rate is to be provided; and (b) means (102) for generating a third control signal to actuate said restricting means (88), including a signal line (102) coupled at one end (104) between said first control valve means (18) and said second control valve means (28) and at another end (106) to said restricting means (88).

17. A fluid control system according to claim 16 wherein said restricting means (88) is common to said first control signal generating means (20,90,96) and said second control signal generating means (20,88,102).

* * * * *